Nov. 20, 1923.
R. J. MITCHELL
GATE
Filed Sept. 15, 1922
1,475,131
4 Sheets-Sheet 2
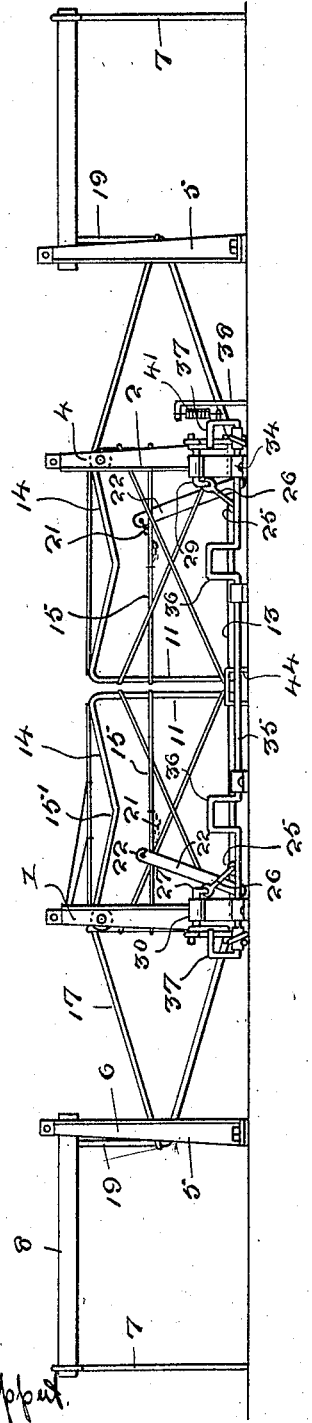
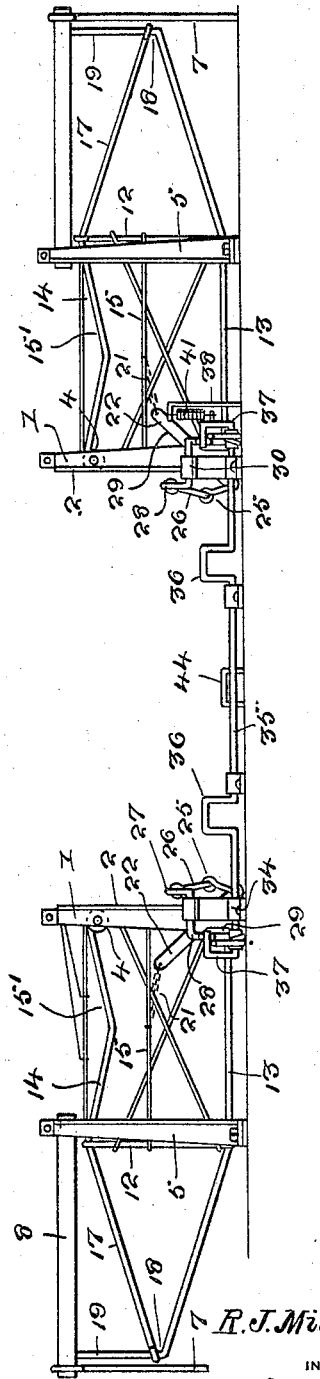
R. J. Mitchell
INVENTOR
BY Victor J. Evans
ATTORNEY

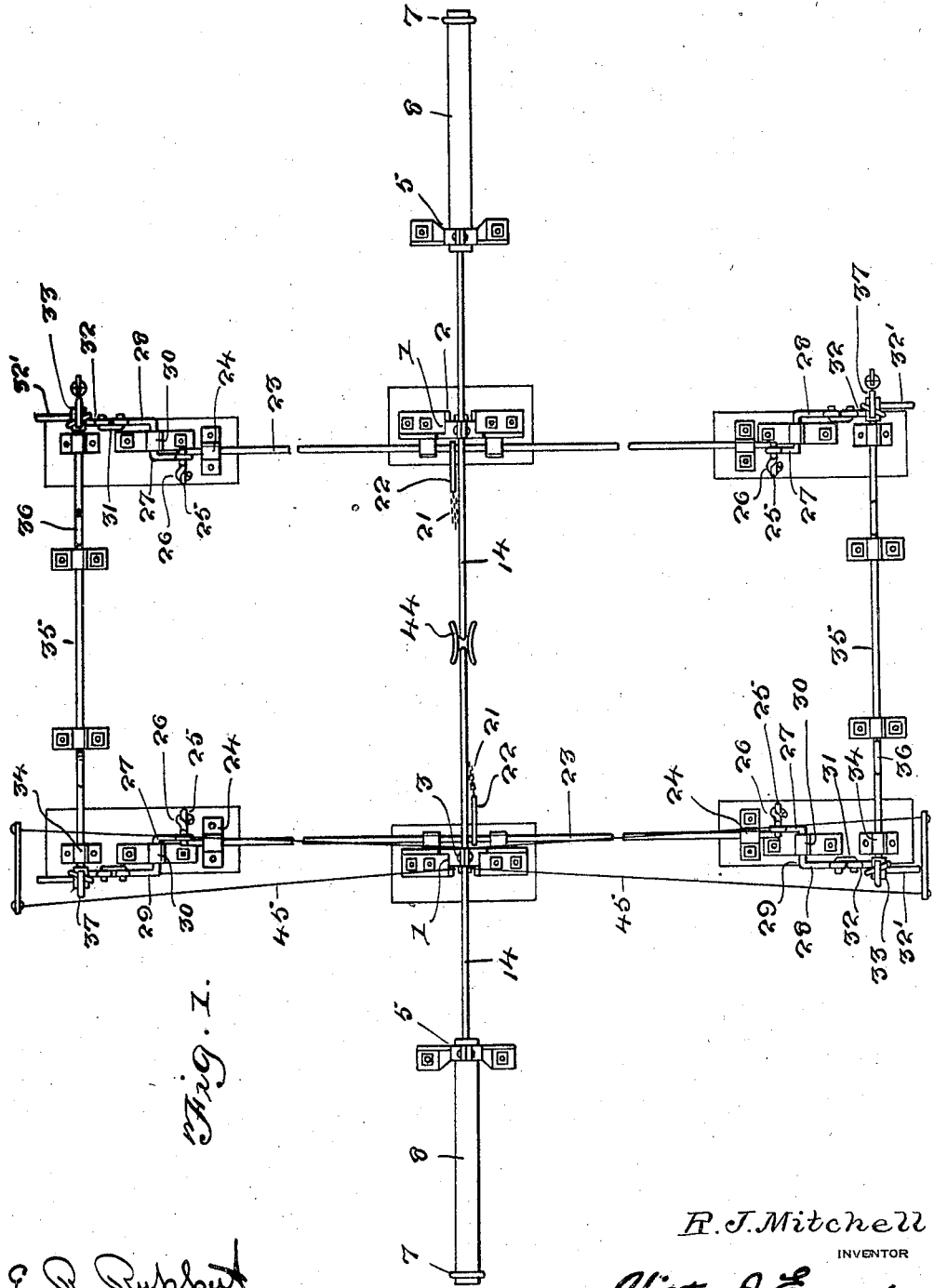

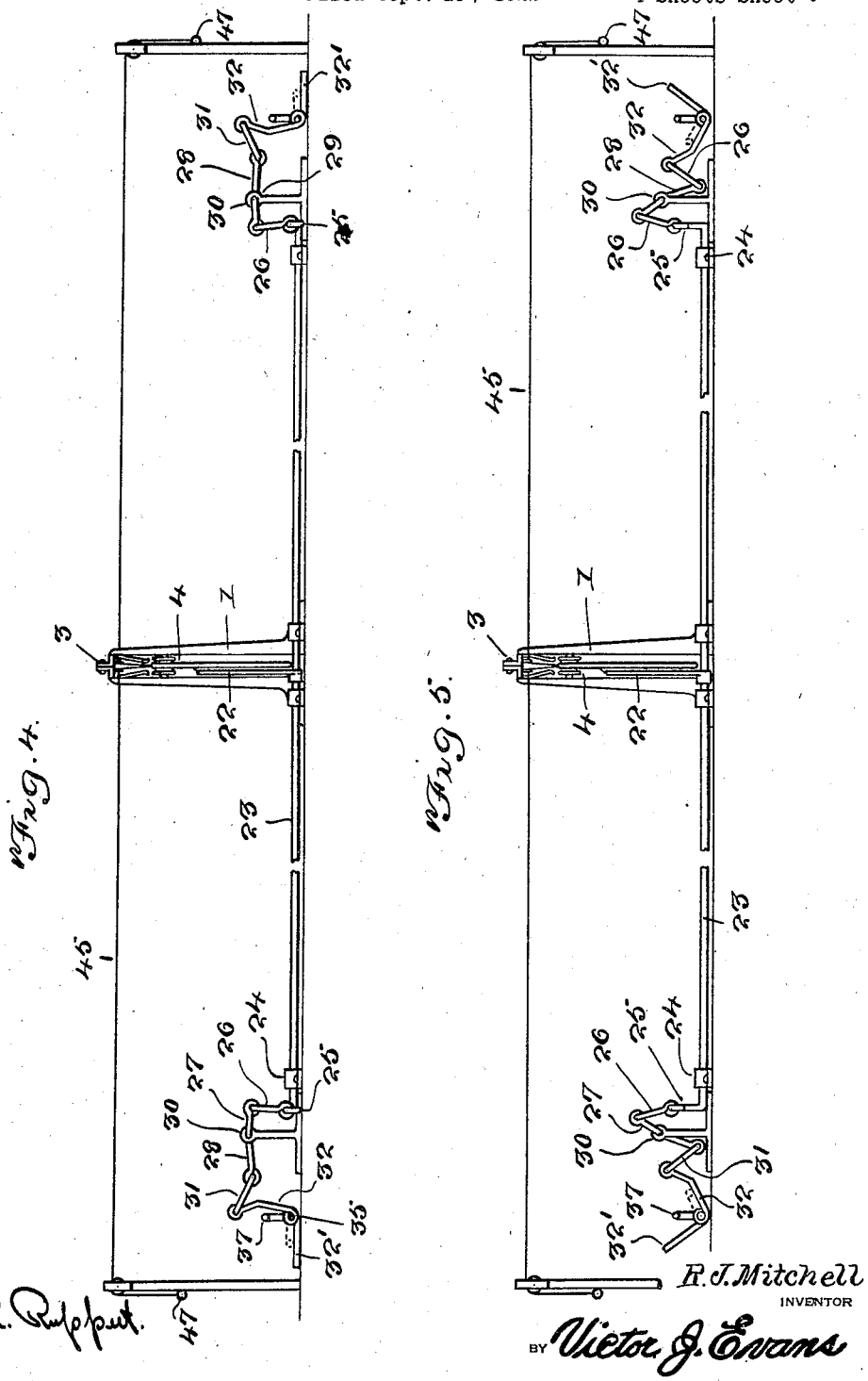

Nov. 20, 1923.
R. J. MITCHELL
GATE
Filed Sept. 15, 1922
1,475,131
4 Sheets-Sheet 4
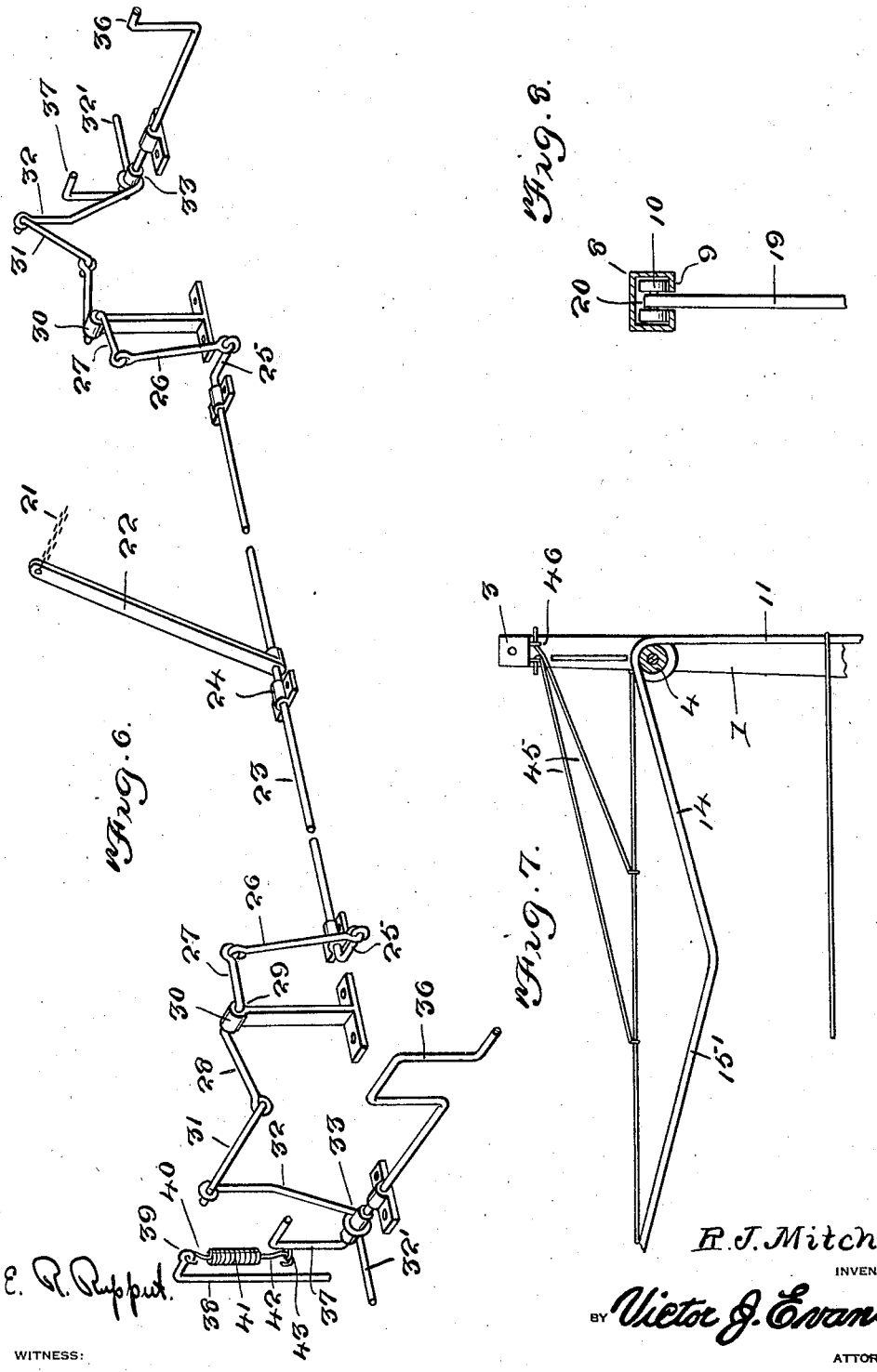
R. J. Mitchell
INVENTOR
BY Victor J. Evans
ATTORNEY
WITNESS:
E. R. Ruppert.

Patented Nov. 20, 1923.

1,475,131

UNITED STATES PATENT OFFICE.

ROBERT J. MITCHELL, OF ADAIR, OKLAHOMA.

GATE.

Application filed September 15, 1922. Serial No. 588,448.

*To all whom it may concern:*

Be it known that I, ROBERT J. MITCHELL, a citizen of the United States, residing at Adair, in the county of Mayes and State of Oklahoma, have invented new and useful Improvements in Gates, of which the following is a specification.

My present invention has reference to farm gates, and has for its object to produce a gate which shall be automatically operated to open position by a person or vehicle approaching the gate, and likewise moved to closed position by the person or vehicle passing through the gateway.

A further object is to produce an automatically operated gate of a construction that shall be freely operated under all conditions and which is not influenced by weather conditions.

A still further object is to produce an automatic gate in which latching or locking means is dispensed with.

A still further object is to produce co-operating gate sections movable a determined distance by mechanism depressed by the wheels of a vehicle or likewise movable such distance by a pull exerted on a flexible element by a horseman or pedestrian, and which sections will thereafter gravitate to either open or closed position.

To the attainment of the foregoing and other objects which will present themselves as the nature of the invention is better understood, reference is to be had to the drawings in which there is illustrated an embodiment of the improvement reduced to practice, and wherein:—

Figure 1 is a plan view with the gates in closed position.

Figure 2 is a side elevation thereof.

Figure 3 is a sectional view on the line 3—3 of Figure 1, showing the arrangement of parts when the gates have been mechanically influenced to a position to permit of the gravitating of the gate sections to fully open position.

Figure 4 is a side elevation showing the gates in fully open position.

Figure 5 is a sectional view on the line 5—5 of Figure 1.

Figure 6 is a detail of the trip mechanism.

Figure 7 is a detail of the track member carried by the gate.

Figure 8 is a detail sectional view of the guideway.

As disclosed by the drawings, the posts and other supporting means for the mechanism constituting the improvement are bolted or otherwise secured by cement supports which are embedded in the ground.

Also, as disclosed by the drawings, two gate sections are employed, but as the same are of similar construction, and as the mechanism operating both sections are also of the same nature, reference to one of the gate sections and the operating parts therefor are to be taken as equally applicable to the other section and operating parts.

At the sides of a roadway I erect posts, each of which being preferably constructed of sheet steel or other substantial metal. Each post includes a base and parallel uprights 1 secured to the base, the uprights having their ends over the base flanged, the said flanged portions receiving the securing elements that pass from the concrete support through the base. The parallel members constituting the posts 1 have their outer edges flanged, as at 2 to reinforce the posts, the upper ends of the parallel members being connected, as at 3, and on the connecting element 3 there are sheave wheels 4 for a purpose which will hereinafter be set forth.

To the rear and in a line with the posts 1 there are other posts 5 also comprising parallel uprights 6 flanged at one or both of their edges to reinforce the same and connected at their tops. The lower ends of these uprights are also flanged outwardly forming foot members through which the means that secure the same to the concrete foundation pass. In a line with the center and to the rear of each of the posts 4 there is an upstanding member or post 7. This post may be in the nature of a metal tube, and between the posts 5 and 6 there is supported a track 8. The track may be also in the nature of a tube which is slotted at is lower center throughout its length and which preferably has the edges of its slotted portion upturned to provide beads 9, and between these beads and the sides of the track member 8 there may be and preferably are arranged anti-frictional bearing members 10.

Each gate section is preferably formed of pipe sections to include an outer end portion 11, an inner parallel member 12, a lower connecting member 13 for the members 11 and 12, an upper connecting member 14 for the said members 11 and 12, and any desired number of longitudinal pipe sections between the said members 11 and 12, one of which being essential, and being indicated for distinction by the numeral 15. The upper member of the gate section is disposed at downward angles from the members 11 and 12 to the center of the said member 14, so that the top of the gate is substantially arched downwardly. This arched portion 15' rests on a roller 16 that is journaled in bearings between the parallel sides of the posts 1. The member 12 of the gate section has extending rearwardly therefrom pipe sections 17 respectively which are inclined in the same direction and which are connected at their meeting ends by a suitable coupling 18, it being understood, of course, that couplings are employed for connecting the other members of the gate section. From the coupling there is a short pipe extension 19 which has extending from its upper end a roller bearing 20, the mounting for which being loosely connected with the pipe member 19, and this roller bearing is designed to be received in the track 8.

Connected to the central bar or member 15 of the gate section, at the center of the said bar there is a short flexible element in the nature of a chain 21 which has its end link connected to an arm 22 that is, of course, disposed between the side members of the posts 1, and that is also connected with a lever 23. The lever 23 is disposed to the outer side of the posts 1 and is journaled, adjacent its ends in suitable bearings 24 secured to the concrete foundation. The lever 23 has its ends cranked as at 25, and to the said cranked ends there are loosely connected links 26. The links 26 are loosely connected to one of the parallel arms 27 of rocking levers. The second arm 28 of each of the rocking levers is disposed at an opposite angle to the arm 27, the connecting element 29 between the arms 27 and 28 being journaled in a vertically disposed bearing 30 secured to a concrete foundation.

The arm 28 of each of the rocking levers is connected by a link 31 to one of the angle arms 32 of a throw lever. For distinction, the second angle arm of the throw lever is indicated by the numeral 32', and the bearing for the said throw lever is indicated by the numeral 33.

Arranged longitudinally of and disposed centrally between the opposed pairs of throw levers there is journaled in bearings 34 the operating lever 35. The lever 35 has cranked portions 36 of a length whereby the same will be contacted by the wheels of vehicles approaching or leaving the gateway, the outer ends of the said operating levers 35 being also cranked, as at 37, the said cranked ends 37 being disposed between the angle arms 32' of the throw lever and in the path of contact with either of said arms.

Arranged outwardly of the cranked ends of the operating levers 35 there are uprights 38, the upper ends of which being provided with eyes 39. In each eye there is received a hook 40 that has attached thereto a coiled spring 41, the outer or free ends of the said springs being also provided with hooks 42 which are designed to be received in eyes 43 on the cranked ends of the operating lever whereby the springs will influence the lever to bring the cranks thereof to a vertical position. The springs may be readily released from the levers by merely removing the hooks, as when the gate sections are not to be operated by vehicles.

The operation will, it is thought, be apparent to those skilled in the art to which this invention relates. A vehicle approaching the gate will have its wheels pass over and swing the operating levers so that the cranked ends thereof will contact with the arms 32 of the throw levers, causing the same to swing the rocking levers and through their link connection to likewise swing the lever 23, causing the arms 22 thereof to draw on the chains 21 to move the gate sections rearwardly or to open position. When the center of the arched upper portion of each of the gate sections passes over the roller 16 the gate sections, by their own weight will swing to fully open position. The springs will return the operating lever to initial position, but the cranked ends thereof will not contact with the outer arms 32 of the throw levers so that the wheels of the vehicle will pass over the inner cranks of the operating lever without further influencing the gate sections.

As the vehicle travels through the gateway, the wheels thereof will contact with the inner cranks on the second operating shaft, causing the depression of the said shaft, and causing the cranked ends thereof to swing against the outer arms 32 of the throw lever, reversing the swinging of the lever 29 and the arm 28 thereof, causing the said arm to influence the chains to move the gate sections to closing position sufficent to bring the central portion of the arched upper bar from the roller, and thereafter allow the gates by their own weight to gravitate to fully closed position. Centrally between the gates there are arranged on a concrete foundation spaced upstanding stop members 44 respectively which receive therebetween the lower bars of the gate sections. The stop members may be and preferably are constructed of tubes, the upper longitudinal elements of which having their ends bent at outward angles to the vertical elements which are received in the foundation, and by this arrangement it will be seen that no latching means is required between the gate sections.

Connected to the vertical member 12 of each of the gate sections there are flexible elements 45 which are respectively trained around the mentioned sheave wheels 4 on the posts 1 and which are directed along the sides of the posts 1 through suitable guide members 45 in posts 46. The ends of the flexible members are provided with handles 47, and a person or horseman approaching the gates will pull upon one of the handles to swing one of the gate sections to open position in a manner which will be apparent, while a pull on the handle of the flexible element on the opposite side of the gate will cause the gate section to move to closed position.

It is believed that the foregoing description, when taken in connection with the drawings will fully set forth the construction, operation and advantages of the improvement to those skilled in the art to which this invention relates, but the right is reserved to make all such changes therefrom as fall within the scope of what is claimed.

Having described the invention, I claim:—

1. Two opposed gates each having their upper longitudinal bars inclined downwardly from the ends to the center thereof and having their rear ends provided with substantially V-shaped extensions, posts comprising spaced uprights between which the gates are arranged, and another post to the rear of each gate, a slotted guide supported between the intermediate and rear posts, and anti-frictional elements supported on the rear of each gate and received in each guide, a roller journaled through the front posts and on which the angle upper bar of the gates rest, levers journaled in bearings disposed transversely at the front of the gates and having angle arms thereon, flexible means on the gates connected to said arms, and means arranged to the sides and transversely of the gates susceptible to swinging movement and associated with means for imparting a swinging movement to the levers to slide the gates to bring the central portion of the upper bars thereof over the rollers to permit of the gates gravitating the remainder of their sliding movement, said gates being halted in such movement by contact with the rollers, and means on the roadbed between the gates for sustaining the gates against swinging movement.

2. Two opposed gates each having their upper bars inclined downwardly from the ends to the center thereof, posts, roller bearings on the end posts on which the angle upper bars of the rails rest, guide means between the remaining posts, anti-frictional means supported from the rear of the gates arranged in said guide means for holding the gates elevated, longitudinally extending levers having cranked ends journaled in bearings transversely of the end posts, arms thereon, flexible elements connecting the arms with the gates, rocking levers connected with the ends of the first mentioned lever, throw levers having angle arms one of which being connected with each rocking lever, a cranked operating lever disposed transversely and arranged centrally between the throw levers, said rocking levers having cranked ends in the path of contact with the arms of the throw levers, spring means influencing the operating levers to normally retain the cranks thereof in vertical position, means for disassociating the spring means and the operating lever.

In testimony whereof I affix my signature.

ROBERT J. MITCHELL.